July 30, 1968 J. PENRAAT 3,394,629
FILM CARTRIDGE FOR VISUAL AID TEACHING MACHINE
Original Filed March 16, 1964 4 Sheets-Sheet 1
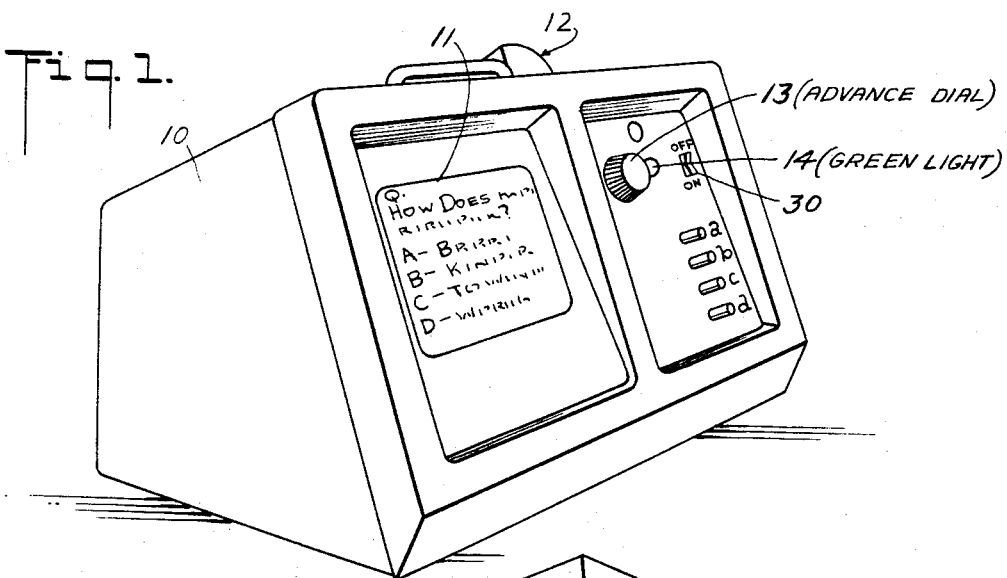
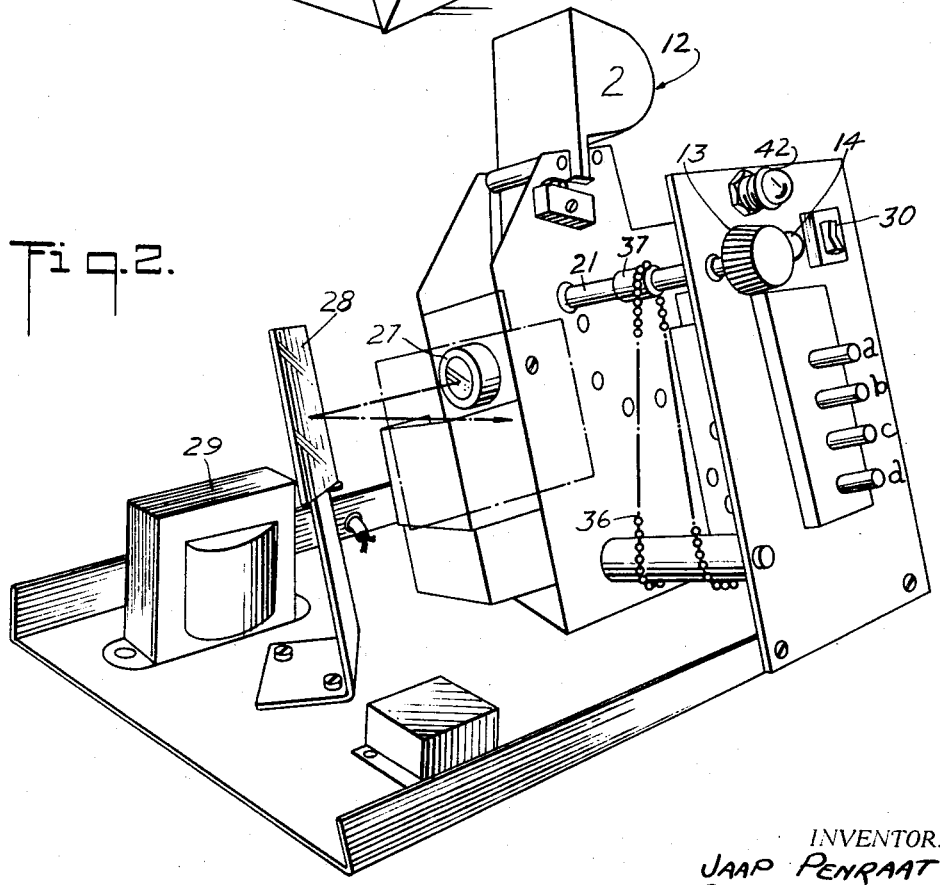
INVENTOR.
JAAP PENRAAT
BY
ATTORNEY July 30, 1968 J. PENRAAT 3,394,629
FILM CARTRIDGE FOR VISUAL AID TEACHING MACHINE
Original Filed March 16, 1964 4 Sheets-Sheet 2

INVENTOR.
JAAP PENRAAT
BY
ATTORNEY

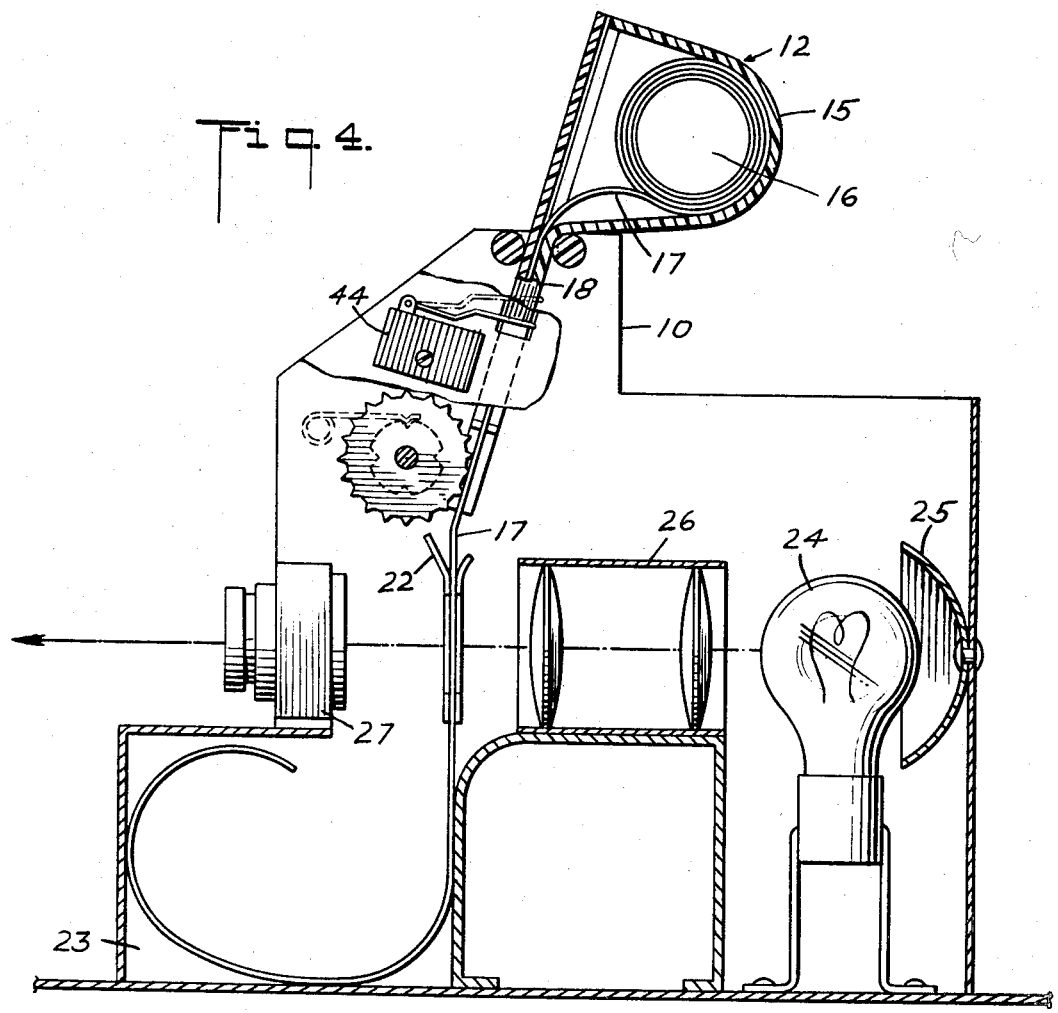
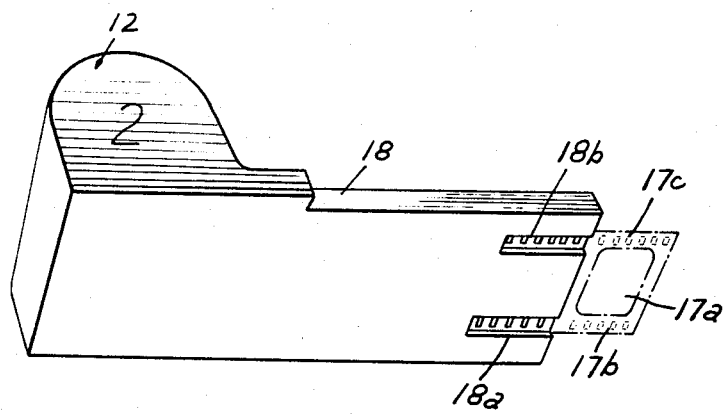

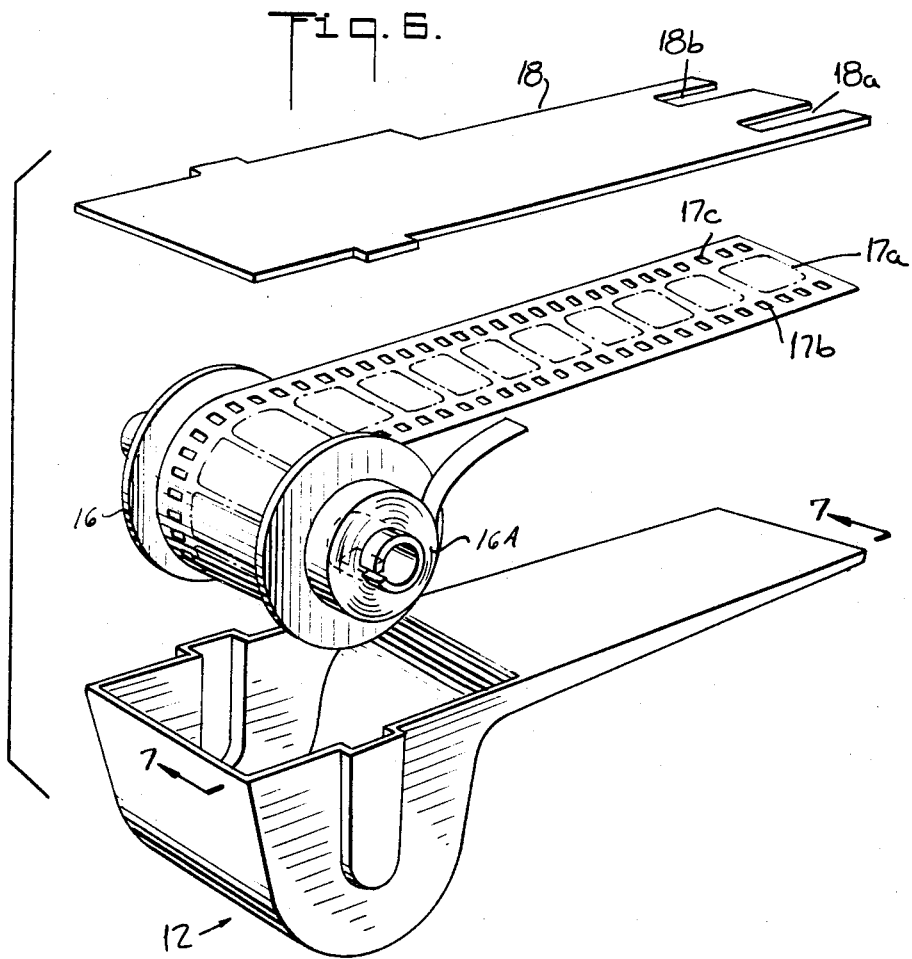
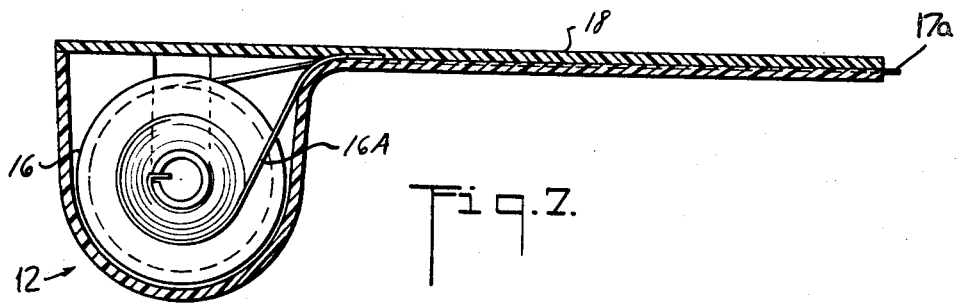

United States Patent Office 3,394,629
Patented July 30, 1968

3,394,629
FILM CARTRIDGE FOR VISUAL AID TEACHING MACHINE
Jaap Penraat, New York, N.Y., assignor to Visual Programming, Inc., New York, N.Y., a corporation of New York
Original application Mar. 16, 1964, Ser. No. 352,045. Divided and this application July 29, 1966, Ser. No. 568,826
5 Claims. (Cl. 88—28)

ABSTRACT OF THE DISCLOSURE

A replaceable film cartridge adapted for use in conjunction with a film projector provided with a casing enclosing a film advance mechanism which includes a sprocket wheel. An opening in the casing affords access to the mechanism. The cartridge includes a film housing having a duct extending therefrom, which duct is receivable in the opening of the film projector to occupy a position therein adjacent the sprocket wheel. A film strip having a series of image frames bordered by a continuous chain of sprocket holes is wound on a reel within the housing of the cartridge. The leading edge of the strip passes through the duct for admission into the projector. The duct includes a slot in alignment with the chain of sprocket holes to expose the chain and to permit the sprocket wheel to engage same for unreeling the film strip.

---

This application is a division of my copending application Ser. No. 352,045, filed Mar. 16, 1964, now abandoned.

This invention relates generally to teaching machines, and more particularly to a replaceable film cartridge for a machine of the type which presents programmed instruction material as well as multiple-choice questions based on such material.

Various forms of educational and testing devices are currently available which may be used by a student for self-teaching and drilling. Such teaching devices not only serve to present information relevant to the subject being taught, but also function to quiz the student's knowledge.

In one known form of teaching machine, the multiple-choice questions are carried on one or more frame on a film strip and are projected on a screen, the questions being consecutively numbered. The machine is equipped with a row of similarly numbered push-button operated electrical switches, and only when the student presses the button corresponding to the correct answer, is a light or sound indication given.

In order to correlate the testing system to the questions, the conventional practice is to provide the film strip which carries the questions with coded apertures or contacts which are sensed by the electrical testing system and serve to complete an electrical circuit to the correct answer indicator only when the button corresponding to the correct answer is actuated.

The difficulty with an arrangement of this known type is that it is not possible to use standard film for the teaching material, for it is necessary to modify the film strip to impart thereto coding apertures, or electrical contacts or whatever other expedients are used to coordinate the answers on a given frame of the strip with the push-button testing mechanism. This greatly adds to the expense of manufacture and complicates the operating structure.

In view of the foregoing, it is the main object of this invention to provide an improved teaching machine in which information and multiple-choice questions related thereto are carried on a series of standard frames on a film strip, the frame-by-frame advance of the strip being coordinated with a coding drum incorporated in a multiple-choice testing system, whereby only when the push-button switch corresponding to the correct answer is closed, will an indication be given.

A significant feature of the invention resides in the fact that conventional film may be used in the machine, devoid of coding apertures or contacts, the testing system being independent of the film structure.

Also an object of the invention is to provide a novel teaching machine of the above-described type in which replaceable cartridges, each containing a film reel, may be inserted, and in which the coding drum testing system is properly coordinated to the frames on the reel regardless of differences in subject-matter.

Thus one important advantage of the invention is that even though the film, per se, is conventional, the student may successively insert film cartridges containing different subject-matter, and then carry out multiple-choice questioning without regard to which cartridge is inserted. In this way the machine may be used with a large library of cartridges, without the need to make any adjustment in the testing system as different cartridges are used.

For a better understanding of the invention, as well as other objects and further features thereof, reference is made to the following detailed description to be read in conjunction with the accompanying drawings, wherein:

FIG. 1 is a perspective view of a teaching machine in accordance with the invention;

FIG. 2 shows the machine with the casing removed;

FIG. 4 is a transverse section of the machine taken in the vertical plane indicated by lines 5—5 in FIG. 3;

FIG. 5 is a perspective view of the film cartridge;

FIG. 6 is an exploded view, in perspective, of the film cartridge; and

FIG. 7 is a longitudinal section of the cartridge taken in the plane indicated by line 7—7 in FIG. 6.

Figure 3:
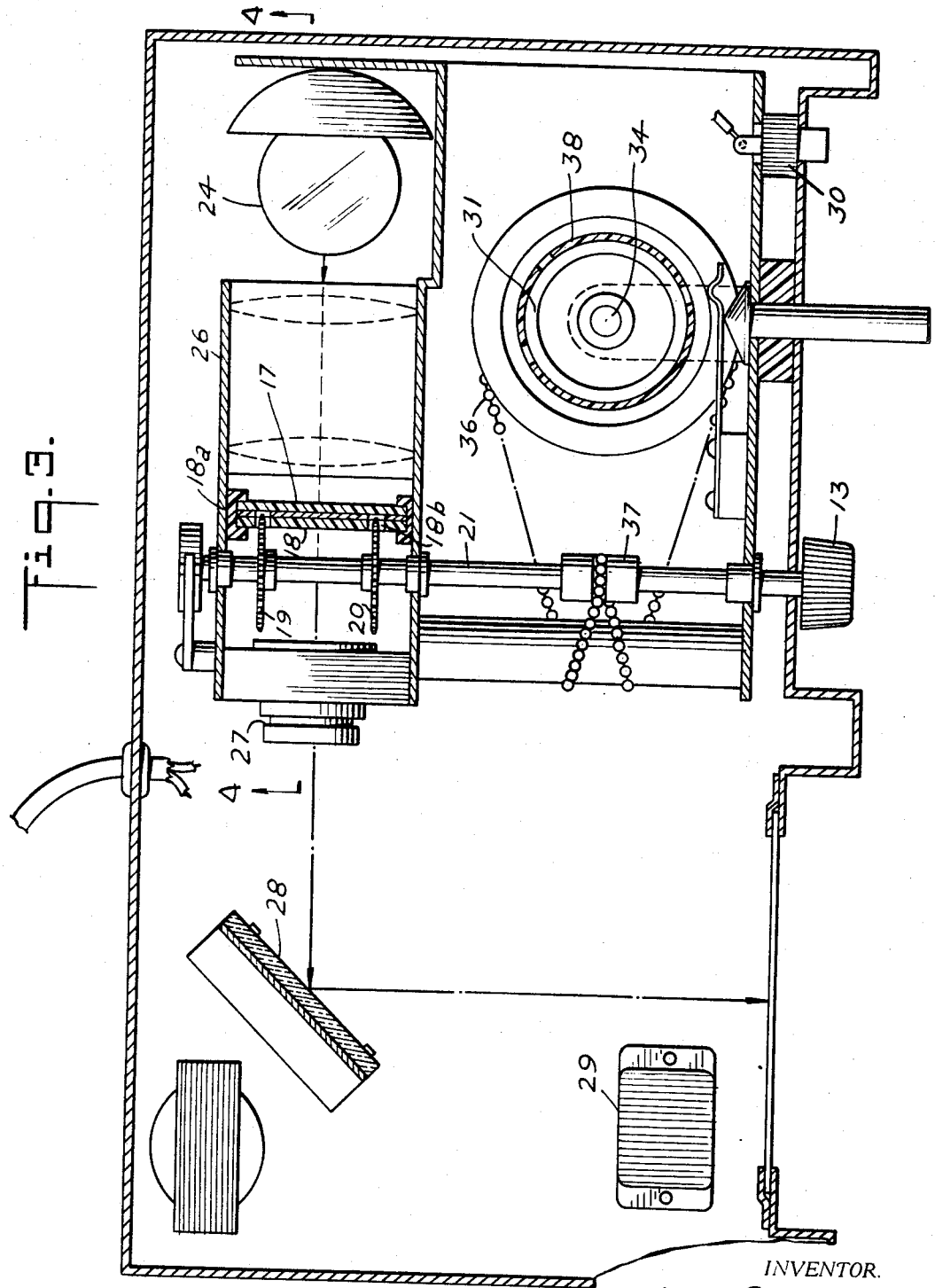
FIG. 3 is a longitudinal section taken in the horizontal plane through the machine.

Referring now to FIG. 1, there is shown a teaching machine in accordance with the invention, the machine being housed in a casing 10 and having a viewing screen 11 onto which images are optically presented from film frames contained on a reel supported within a cartridge 12. The film frames are advanced by means of a manually-operated dial 13.

When a film frame is projected, it may contain either educational material or a question based thereon, followed by a series of possible answers, only one of which is correct. Thus, shown on screen 11 is the text of a question Q, followed by a series of possible answers A, B, C and D. Provided on the machine is a row of push buttons a, b, c and d which depress electrical switches. The student being questioned presses the button whose letter identification corresponds to what he believes to be the correct answer. In the event his choice is correct, a light indicator 14 will be illuminated and a buzzer will sound.

As best seen in FIGS. 4 and 5, the film cartridge 12 is constituted by a plastic housing 15 which encloses a spring-loaded reel 16 onto which is wound a strip of film 17. As shown in FIGS. 6 and 7, spring loading is effected by a spring 16A which is coiled on the shaft of reel 16, such that when the film strip 17 is extended from without the cartridge and thereafter released, the spring acts to cause the reel to retract the film into the cartridge. The film unwound from the reel passes through a duct extension 18 integral with the housing, the end of this extension being provided with a pair of spaced slots 18a and 18b which are positioned to expose the sprocket holes on the film. As will be seen in FIG. 5, the film strip 17 is made up of a series of frames 17a, etc., the frames being bordered by a continuous chain of sprocket holes 17b and 17c. In practice I have printed the film strip with sixteen frames per foot as against the conventional eight frames to maximize the use of film within the available cartridge space.

The cartridge, as evident in FIG. 4, is inserted in an opening on the top side of casing 10, the duct extension 18 projecting into the casing, and the housing 15 resting on top thereof. When the duct extension is inserted, the sprocket holes on the film are engaged by a pair of sprocket wheels 19 and 20 (FIG. 3), keyed to a shaft 21, the wheels being received within slots 18a and 18b of the duct. The shaft 21 extends outside of the casing and terminates in the advance dial 13.

The film advanced by the sprocket wheels 19 and 20 passes through a projector window 22 and curls into a reservoir 23 at the bottom of the casing. Thus by rotating the dial 13 in one direction, the film is advanced frame by frame through projector window 22, the film being unreeled from the cartridge and being stored in the reservoir. When the dial movement is reversed, the film is returned to the cartridge and when fully taken up on the reel therein, the cartridge may be removed from the machine.

In lieu of a rotary advance system, an automatic push button step system may be used in which a solenoid actuated mechanism serves to advance the film step by step. It is also to be noted that the cartridge-projector arrangement shown herein is also useful as a film or slide projector entirely apart from programmed teaching functions.

As best seen in FIGS. 3 and 4, the projector section of the machine further includes a light bulb 24 preferably of the low voltage (12 volts), high-brilliance type used in automobile headlamps. Light from the lamp is directed by a back reflector 25 into a condenser lens barrel 26 and from there through the window 22 into a projector lens 27. The condenser lens 26 serves to provide a uniform field of intense light, whereas the projector lens 27 casts the image of the film frame lying in the window onto a reflecting mirror 28, which directs the enlarged image onto screen 11. The operating voltage for the projector bulb 24 is obtained from a stepdown transformer 29 connected to the power line through a main switch 30 mounted on the front panel of the machine.

As shown in FIG. 3, a coding drum assembly is provided which is constituted by a metallic drum 31 mounted for rotation between bearings on a shaft 34. Rotation of the drum is effected by a pulley wheel mounted on the same shaft. The pulley wheel is linked by a continuous chain 36 to the advance shaft 21 of the projector, the chain encircling a grooved collar 37 keyed to shaft 21. Telescoping over drum 31 is an apertured coding cylinder 38 of insulating material. The details of the coding drum assembly and the manner in which it functions in co-operation with the film is set forth in said copending application.

While there has been shown a preferred embodiment of a film cartridge for visual aid teaching machine in accordance with the invention, it will be appreciated that many changes and modifications may be made therein without, however, departing from the essential spirit of the invention as defined in the annexed claims.

What I claim is:

1. A film cartridge in combination with a film projector provided with a casing within which is disposed a film advance mechanism including at least one sprocket wheel, said casing having an opening providing access to said mechanism, said cartridge comprising:

(a) a film housing having a duct extending therefrom, said duct being received in said opening to occupy a position within said casing adjacent the sprocket wheel of said film advance mechanism,
   (b) a rotatable reel disposed within said housing, and
   (c) a strip of film wound on said reel within said housing and having a series of image frames thereon bordered by a continuous chain of sprocket holes, the leading edge of said strip passing through said duct for admission into said film advance mechanism, said duct having at least one slot in alignment with said chain of sprocket holes to expose said chain and to permit said sprocket wheel to engage same for unreeling said strip.

2. A cartridge as set forth in claim 1, further including spring means coupled to the reel to retract said strip into the housing.

3. A film cartridge as set forth in claim 1, wherein said image frames are bordered on both sides by continuous chains of sprocket holes, and said duct includes two slots in alignment with said chains to permit a pair of sprocket wheels to engage said chains.

4. A film cartridge as set forth in claim 1, wherein said film strip has sixteen frames per foot to minimize the use of film within the available cartridge space.

5. A film cartridge as set forth in claim 1, wherein said housing and duct are formed of plastic material and are integral with each other.

References Cited
UNITED STATES PATENTS

| | | | |
|---|---|---|---|
| 2,674,930 | 4/1954 | Goldhammer | 88—28 |
| 3,033,077 | 5/1962 | Schwartz et al. | 88—28 |
| 3,317,151 | 5/1967 | Wright | 242—55.12 |
| 3,323,744 | 6/1967 | Chesley et al. | 242—71.1 |

NORTON ANSHER, *Primary Examiner.*

GARY M. HOFFMAN, *Assistant Examiner.*